(No Model.) 2 Sheets—Sheet 1.
C. R. SYLVESTER.
TURBINE WATER WHEEL.

No. 321,660. Patented July 7, 1885.

Witnesses:
E. J. Asmus
M. Taunheimer

Inventor.
Charles R. Sylvester
By
Stout & Underwood
Attorneys.

(No Model.) 2 Sheets—Sheet 2.

C. R. SYLVESTER.
TURBINE WATER WHEEL.

No. 321,660. Patented July 7, 1885.

Witnesses:

Inventor
Charles R. Sylvester
By
Stout & Underwood
Attorneys.

UNITED STATES PATENT OFFICE.

CHARLES R. SYLVESTER, OF LITTLE FALLS, ASSIGNOR OF ONE-HALF TO GEORGE SYLVESTER, OF MILWAUKEE, WISCONSIN.

TURBINE WATER-WHEEL.

SPECIFICATION forming part of Letters Patent No. 321,660, dated July 7, 1885.

Application filed August 1, 1883. (No model.)

*To all whom it may concern:*

Be it known that I, CHARLES R. SYLVESTER, of Little Falls, in the county of Polk and in the State of Wisconsin, have invented certain new and useful Improvements in Turbine Water-Wheels; and I do hereby declare that the following is a full, clear, and exact description thereof.

My invention relates to water-wheels or turbines, and will be fully described hereinafter.

Figure 1:
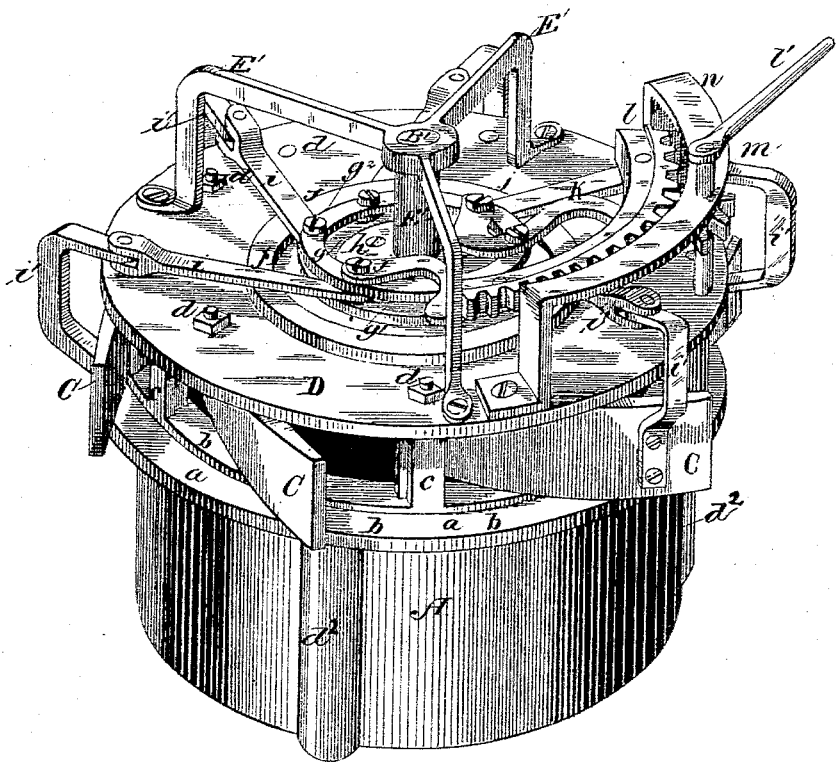
Figure 2:
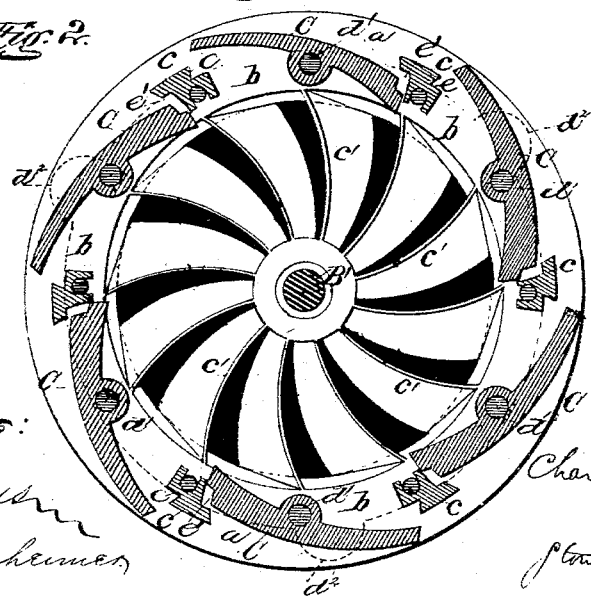
Figure 3:
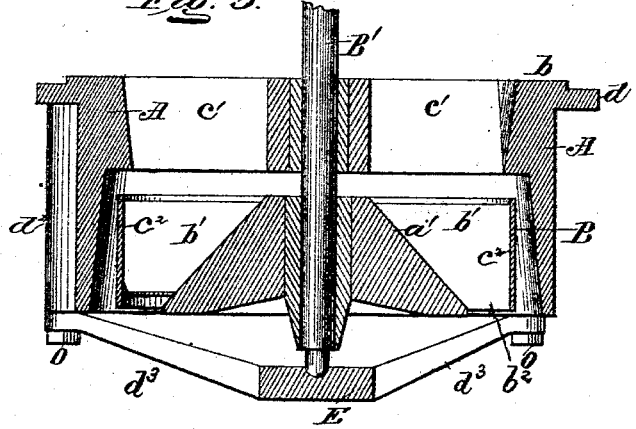
Figure 4:
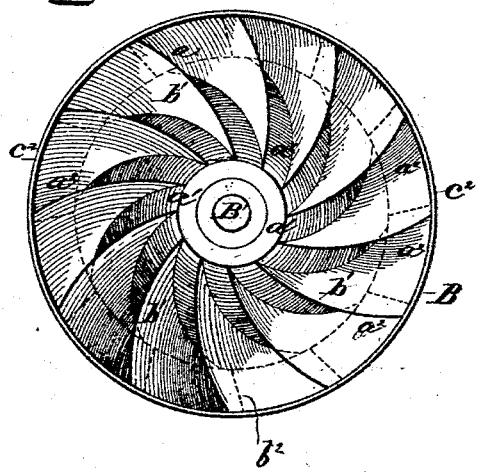

In the drawings, Figure 1 is a perspective view of the water-wheel. Fig. 2 is a horizontal section of the same through gates. Fig. 3 is a vertical section through center of wheel, the crown-plate having been taken off. Fig. 4 is a top plan view of the wheel proper.

A is the wheel-casing, having a flange, $a$, with step $b$, in which are formed mortises (not shown) for crown-plate posts $c\,c$ and holes for screw-bolts $d^2\,d^2$, to connect said crown-plate D with wheel-casing A.

$d'\,d'$ are ribs for strengthening said casing, and into which to bolt spider-legs $d^3\,d^3$.

$c'\,c'\,c'$ are the water-guides or directrices formed in the top of said casing A.

B is the wheel proper, which has conical hub $a'$, curved vanes $b'$, and outer rim-plate, $c^2$, forming the wheel-buckets $a^2\,a^2$, the lower opening of which is shown by the dotted lines of Fig. 4 in $b^2$.

B' is the wheel-shaft.

C C are the water-gates, which pivot between posts $c\,c$ on shafts $d''d'$, passing through their flanged center. When closed, their front and rear edges respectively fit in recesses $e$ and $e'$, formed in crown-plate posts $c\,c$. Their bent arms $i'\,i'$ hinge in forked links $i\,i$. The central part of the crown-plate D has an elevated portion, $f$, in which is an annular groove, $g$, in which works the base of the annular table $g'$. The inner rim of this base is overlapped and held horizontally in position by the annular piece $h$, which is attached to the center of the crown-plate. Between the base of the table $g'$ and an upper ring, $g^2$, which is secured to it, the inward end of links $i\,i\,i$ hinges on bolts $j\,j\,j$, which are used also in part for fixing to adjusting-table $g$ bracket $k$ of toothed segment $l$. To the forked end of links $i\,i$ is freely jointed end of bent arms $i'$ $i'\,i'$ of gates C C. The adjusting of said gates C C is done by means of the hand-lever $l'$, actuating pinion-bolt $m$ in usual manner. $n$ is the curved bracket supporting said pinion-bolt $m$.

E' is the tripod or upper spider, having center hole for shaft B'.

E is the spider proper, and $o\,o$ the bolts to secure it to the wheel-casing A in ribs $d^2\,d^2$.

I am aware that numerous attempts have been made to direct the water on the buckets of water-wheels so as to secure the best action on said buckets; but I claim that by making the wheel with a scroll declining from the center toward the rim, and with a decline also from the top of the buckets downward to the issue, I have devised a direct way to secure the fullest action and reaction of the water, the same being gradually and equally closing on all sides of the buckets until it leaves them. Further, in the construction of my guide-vanes—that is, in guiding the water onto the buckets of the wheel by a set of independent guides, instead of using the wheel-gates—I obtain a sure and steady action, which in the ordinary construction cannot well be secured, since, as the gates are being variously adjusted to suit the needs of the driven machinery, their larger or small opening must in some degree affect the course of the water.

Having thus described my invention, what I claim as new and useful, and desire to secure by Letters Patent, is—

1. An improved turbine water-wheel consisting of casing A, having flange $a$, step $b$, water-guides $c'\,c'\,c'$, and ribs $d^2\,d^2$, wheel proper B, having conical hub $a'$, curved vanes $b'$, outer rim-plate, $c^2$, and shaft B', of gates C C, crown-plate D, having adjusting-table $g'$, with ring $g^2$, links $i\,i\,i$, jointed freely with arms $i'\,i'$ of gates C C, curved bracket $n$, pinion-bolt $m$, and pinion-operating toothed segment $l$, spider E, having bolts $o\,o$, and tripod E', having central opening for shaft B', all the parts being in combination substantially as shown and described.

2. In a turbine water-wheel, the casing A, having water-guides $c'\,c'\,c'$, flange $a$, step $b$, and ribs $d^2\,d^2$, substantially as shown and described, and for the purpose set forth.

3. In a turbine water-wheel, the combination of crown-plate D, having posts $c\ c$, bolts $d\ d$, and elevated central portion, $f$, having groove $g$, gates C C, shafts $d'\ d'$, bent arms $i'\ i'$, forked links $i\ i$, and adjusting-table $g'$, substantially as and for the purpose set forth.

4. In a turbine water-wheel, the combination, with the wheel-casing A, having flange $a$, step $b$, and water-guides $c'\ c'$, of the wheel B, having cone-shaped hub $a'$, curved vanes $b'$, outer rim-plate, $c^2$, and lower openings, $b^2$, substantially as shown and described.

5. In a turbine water-wheel, the combination, with casing A, having flange $a$, step $b$, and water-guides $c'\ c'\ c'$, of crown-plate D, having posts $c\ c\ c$, bolts $d\ d$, and central elevated portion, $f$, having annular groove $g$, gates C C, the shafts $d'\ d'$, bent arms $i'\ i'$, forked links $i\ i$, the adjusting-table $g'$, and its gearing, substantially as shown and described, and for the purpose set forth.

6. The combination of the casing A, the guides $c'$, at the top of the casing, and the wheel B, having hub $a'$, vanes $b'$, and buckets $a^2$, at the bottom of the casing.

7. The combination of the casing A, the spider E, secured to the bottom of the casing, the shaft B, supported in the spider at a point below the bottom of the casing, the wheel B, conterminous with the bottom of the casing, and the guides $c'$, terminating upwardly at the top of the casing.

8. The combination of the adjusting-table $g'$, the links $i$, the arms $i'$, and the gates C, with the guides $c'$, and the wheel B, having hub $a'$, vanes $b'$, and buckets $a^2$.

In testimony that I claim the foregoing I have hereunto set my hand, on this 23d day of July, 1883, in the presence of two witnesses.

CHARLES R. SYLVESTER.

Witnesses:
T. L. HENISEN,
B. F. SYLVESTER.